United States Patent [19]

Kalman et al.

[11] Patent Number: 5,185,749
[45] Date of Patent: Feb. 9, 1993

[54] LARGE SIGNAL THREE-LEVEL SUPERFLUORESCENT FIBER SOURCES

[75] Inventors: Robert F. Kalman, Sunnyvale; Paul F. Wysocki, Stanford; Michel J. F. Digonnet, Palo Alto, all of Calif.

[73] Assignee: The Board of Trustee of the Leland Stanford Junior University, Stanford, Calif.

[21] Appl. No.: 897,603

[22] Filed: Jun. 10, 1992

Related U.S. Application Data

[63] Continuation of Ser. No. 666,264, Mar. 7, 1991, abandoned, which is a continuation-in-part of Ser. No. 584,806, Sep. 18, 1990, abandoned.

[51] Int. Cl.$^5$ .............................................. H01S 3/30
[52] U.S. Cl. .......................................... 372/6; 372/69; 372/70; 372/71; 372/75; 385/39; 385/8; 385/9
[58] Field of Search .................... 372/6, 69, 70, 75, 71, 372/92; 385/15, 9, 27, 32, 39, 42, 49, 8, 130

[56] References Cited

U.S. PATENT DOCUMENTS

| | | | |
|---|---|---|---|
| 4,386,822 | 6/1983 | Bergh | 385/11 |
| 4,410,275 | 10/1983 | Shaw et al. | 356/350 |
| 4,456,377 | 6/1984 | Shaw et al. | 356/350 |
| 4,493,528 | 1/1985 | Shaw | 385/42 |
| 4,529,312 | 7/1985 | Pavlath et al. | 356/350 |
| 4,536,058 | 8/1985 | Shaw et al. | 356/128 |
| 4,564,262 | 1/1986 | Shaw | 385/51 |
| 4,601,541 | 7/1986 | Shaw et al. | 385/51 |
| 4,634,282 | 1/1987 | Shaw | 356/350 |
| 4,637,025 | 1/1987 | Snitzer et al. | 372/6 |
| 4,637,722 | 1/1987 | Kim | 356/350 |
| 4,687,330 | 8/1987 | Lefevre | 356/350 |
| 4,773,759 | 9/1988 | Shaw | 356/350 |
| 4,779,975 | 10/1988 | Kim | 356/350 |
| 4,881,817 | 11/1989 | Kim et al. | 356/350 |
| 4,938,556 | 7/1990 | Digonnet | 372/6 |
| 4,964,131 | 10/1990 | Liu et al. | 372/6 |
| 5,005,175 | 4/1991 | Desurvire et al. | 372/6 |
| 5,027,079 | 6/1991 | Desurvire et al. | 376/6 |

OTHER PUBLICATIONS

P. R. Morkel and R. I. Laming, "Theoretical Modeling of Erbium-Doped Fiber Amplifiers with Excited-State Absorption," *Optics Letters*, vol. 14, No. 19, pp. 1062–1064, Oct. 1, 1989.

R. I. Laming, S. B. Poole and E. J. Tarbox, "Pump Excited-State Absorption in Erbium-Doped Fibers," *Optics Letters*, vol. 13, No. 12, pp. 1084–1086, Dec. 1988.

E. Snitzer et al., "Erbium Fiber Laser Amplifier at 1.55 μm with Pump at 1.49 μm and Yb Sensitized Er Oscillator", in Tech. Dig. Optical Fiber Communic. Conf. (Washington, D.C.), 1988, Post-deadline paper PD-2, (no month).

D. P. Bour, N. A. Dinkel, D. B. Gilbert, K. B. Fabian and M. G. Harvey "980 nm Diode Laser for Pumping $Er^3$-Doped Fiber Amplifiers," *IEEE Photonics Technology Letters*, vol. 2, No. 3, pp. 153–155, Mar. 1990.

M. J. F. Digonnet, "Theory of Superfluorescent Fiber Lasers," *Journal of Lightwave Technology*, vol. 4, No. 11, pp. 163–1639, Nov. 1986.

Mears et al., Reekie, I. M. Juncey and D. N. Payne, "Low-noise Erbium-Doped Fiber Amplifier Operating at 1.54 μm," *Electronics Letters*, vol. 23, No. 19, pp. 1026–1027, Sep. 1987.

W. K. Burns et al., "Fiber-Optic Gyroscopes with Broad-Band Sources," *Journal of Lightwave Technology*, vol. LT-1, No. 1, pp. 98–105, Mar. 1983.

(List continued on next page.)

*Primary Examiner*—Georgia Y. Epps
*Attorney, Agent, or Firm*—Knobbe, Martens, Olson & Bear

[57] ABSTRACT

There is disclosed a new superfluorescent source comprising a long fiber doped with a lasing material presenting three-level transitions, such as Erbium. Due to the ground state signal absorption present in three-level systems, the source of the present invention can achieve backward signal quantum efficiencies well in excess of the limit of 0.5 exhibited by four-level systems. The source can be used in a Sagnac interferometer which may comprise an optical isolator because of possible high feedback.

33 Claims, 7 Drawing Sheets

OTHER PUBLICATIONS

E. Desurvire et al., "Amplification of Spontaneous Emission in Erbium-Doped Single-Mode Fibers," *Journal of Lightwave Technology*, vol. 7, No. 5, pp. 835–845 (May 1989).

P. R. Morkel, "Erbium-Doped Fibre Superluminescent Source for the Fibre Gyroscope," *Springer Proceedings in Physics*, vol. 44, in *Optical Fiber Sensors*, Springer-Verlag Berlin, Heidelberg, 1989, (no month).

P. F. Wysocki et al., "Broad Spectrum, Wavelength Swept Erbium-Doped Fiber Laser at 1550 nm," Opt. Lett. 15, 16, 879–881 (1990).

P. F. Wysocki et al., "1.55 μm Broadband Fiber Sources Pumped near 980 nm," Fiber Laser Sources and Amplifiers II, Proc. SPIE, vol. 1373 (May 1990).

P. F. Wysocki et al., "Spectral Characteristics of High Power 1.55 μm Broad-Band Superluminescent Fiber Sources," IEEE Photon. Techno. Lett. 2, 3, 178–180 (Mar. 1990).

M. J. F. Digonnet, "Analysis of a 1060-nm Nd: $SiO_2$ Superfluorescent Fiber Laser," J. Lightwave Technol., vol. 7, No. 7, pp. 1009–1015, Jul. 1989.

M. J. F. Digonnet and C. J. Gaeta, "Theoretical Analysis of Optical Fiber Laser Amplifiers and Oscillators," Appl. Opt. 24, 3, 333–342 (Feb. 1985).

R. F. Kalman et al., "Modeling of 3-Level Laser Superfluorescent Fiber Sources," Fiber Laser Sources and Amplifiers II, Proc. SPIE 1373 (1990), (no month).

E. Desurvire and J. R. Simpson, "Amplification of Spontaneous Emission in Erbium-Doped Single-Mode Fibers," J. Lightwave Techol., vol. 7, No. 5, pp. 835–845, (May 1989).

E. Desurvire, C. R. Giles, and J. R. Simpson, "Gain Saturation Effects in High-Speed, Multichannel Erbium-Doped Fiber Amplifiers at $\lambda=1.53$ microns," J. Lightwave Technol., vol. 7, No. 12, pp. 2095–2104, (Dec. 1989).

P. F. Wysocki et al., "Wavelength Stability of a High--Output, Broadband, Er-Doped Superfluorescent Fiber Source Pumped near 980 nm," Optics Letters, vol. 16, No. 12, Jun. 15, 1991.

LARGE SIGNAL THREE-LEVEL SUPERFLUORESCENT FIBER SOURCES

Related Application

This application is a continuation of Ser. No. 07/666,264, filed Mar. 7, 1991, now abandoned, which is a continuation-in-part of U.S. patent application Ser. No. 584,806, filed on Sep. 18, 1990, now abandoned. This application is assigned to the same assignee of the parent application.

BACKGROUND OF THE INVENTION

The present invention is in the field of light sources, and more particularly, in the field of rare earth-doped superfluorescent fiber sources in which an optical fiber is doped with a medium that can lase and in which the optical fiber is pumped with a pump optical signal to generate an output signal to be detected by a detector.

Optical fibers are being used for an increasing number of applications. One such application is an optical fiber rotation sensor comprising a loop of optical fiber into which two light signals are introduced and caused to counterpropagate around the optical loop. Such rotation sensors are described, for example, in U.S. Pat. No. 4,410,275; U.S. Pat. No. 4,456,377; U.S. Pat. No. 4,487,330; U.S. Pat. No. 4,634,282; and U.S. Pat. No. 4,637,722. These patents are hereby incorporated by reference herein. For such rotation sensors and for other optical fiber applications, it is desirable to have a stable well-controlled light source.

For some applications, such as certain optical fiber rotation sensors, a high power broadband optical energy source having a short temporal coherence length and no longitudinal mode structure at longer wavelengths is desirable. It has been demonstrated that using a broadband optical energy source in an optical fiber rotation sensor, for example, reduces phase errors caused by the Kerr effect. A broadband optical signal can also be advantageously used to reduce phase errors in the combined optical signal from the loop of the rotation sensor caused by coherent backscattering (i.e., Rayleigh backscattering) and by polarization cross-coupling in the loop. See, for example, U.S. Pat. No. 4,773,759; U.S. patent application Ser. No. 488,732, filed on Apr. 26 1983 now abandoned; and U.S. patent application Ser. No. 909,741 U.S. Pat. No. 4,881,817 filed on Sep. 19, 1986; all of which are assigned to the assignee of the present application. These patents and patent applications are hereby incorporated by reference herein. A theoretical analysis regarding the broadband source requirement for fiber gyroscopes can be found in W. K. Burns, et al., "Fiber-Optic Gyroscopes with Broad-Band Sources," *Journal of Lightwave Technology*, Volume LT-1, Number 1, pp. 98–105, March 1983. This article is hereby incorporated by reference herein. Optical fiber rotation sensors also require sources with highly stable mean wavelengths with little thermal drift. A rotation sensor source must also have the ability to couple high power into the rotation sensor without creating large noise components (high signal/noise ratio). Finally, an ideal rotation sensor source preferably operates in higher wavelength region of the optical spectrum of the source in order to reduce any sensitivity to radiation.

Such broadband optical sources include, for example, superluminescent light emitting diodes, and the like. An exemplary superluminescent diode has a relatively broad optical linewidth (e.g. approximately 15 nm) at the optical wavelengths in the range of 800 to 850 nm, for example. However, for a given power input, exemplary superluminescent diodes may not provide an adequate amount of optical energy when compared to a laser, for example. More importantly, superluminescent diodes cannot be easily coupled to certain optical devices such as gyroscopes as the light emitted by superluminescent diodes is highly divergent. In particular, the power produced by a superluminescent diode is difficult to efficiently couple into single-mode fibers. Furthermore, it is known that the temperature stability of the emission wavelength of a typical superluminescent diode is not satisfactory for numerous applications. The mean wavelength of superluminescent diodes varies about $-300$ ppm/°C., which is inadequate for high sensitivity gyroscope applications that often require a mean wavelength stable to about 1 ppm.

More recently, U.S. Pat. No. 4,637,025 to Snitzer, et al., described a superradiant light source that includes an optical fiber having a core doped with a selected active laser material such as Neodymium.

U.S. patent application Ser. No. 281,088, filed on Dec. 7, 1988 U.S. Pat. No. 4,938,556, discloses a superfluorescent fiber source comprising a fiber doped with laser material coupling to a multiplexing coupler. This application is assigned to the assignee of the present application. Such a superfluorescent source has good output power and easily couples to an optical fiber rotation sensor. It does not have longitudinal cavity modes and shows good thermal stability. Its spectrum is much broader than a resonant laser source. The above patent and patent application are hereby incorporated by reference herein.

U.S. patent application Ser. No. 176,739, filed on Apr. 1, 1988, now abandoned describes a light source which uses an optical fiber doped with a lasing material such as Neodymium. This application is assigned to the assignee of the present application and is hereby incorporated by reference herein. The optical fiber is pumped with a pump optical signal having a pump wavelength selected to cause spontaneous emission of an optical signal at a second wavelength different from the pump wavelength. The wavelength of the pump optical signal is selected to be outside the pump variable tuning range of the Neodymium-doped optical fiber (i.e., the range of pump wavelengths which stimulate emitted wavelengths having an average wavelength with a generally one-to-one correspondence to the pump wavelength). Pumping with a pump signal outside the pump variable tuning ranges causes the emitted light to have a broad spectral envelope of longitudinal modes having emission wavelengths corresponding to substantially all the pump variable tuning range.

Neodymium-doped superfluorescent fiber sources have therefore alleviated the problems raised by either resonant cavity lasers or superluminescent diodes. Such sources can deliver milliwatts of power into a fiber optic gyroscope with broadband spectra and good thermal stability.

In recent years, Erbium-doped fibers have received increasing attention as possible sources and for amplification purposes in the low loss fiber communication window at 1500 nm. It is possible to obtain a high gain when the Erbium dopant is properly doped into the fiber, typically a silica fiber. The light emitted by Erbium-doped fibers easily couples into other fibers with similar mode sizes. An Erbium-doped fiber is also thermally relatively stable. Additionally, Erbium-doped fibers emit longer wavelength light than Neodymium-doped fibers, which makes them less sensitive to radiation induced loss mechanisms.

A theoretical analysis of amplified spontaneous emission can be found in an article by E. Desurvire et al., "Amplification of Spontaneous Emission in Erbium-Doped Single-Mode Fibers," *Journal of Lightwave Technology*, Volume 7, No. 5, pp. 835–845 (May 1989). The operation of an Erbium-doped silica fiber as a superfluorescent source at 1535 nm and pumped at 980 nm is also reported in an article by P. R. Morkel, "Erbium-Doped Fibre Superluminescent Source for the Fibre Gyroscope," *Springer Proceedings in Physics*, Volume 44, in Optical Fiber Sensors. Springer-Verlag Berlin, Heidelberg 1989. This article analyses the variation of superfluorescent output power with the pump power and the fiber length and observes the dependence of the spectrum of the superfluorescent emission on fibre length, pump power and fiber temperature. However, that article does not propose any method for minimizing the thermal variations of the output spectrum.

Although both Neodymium- and Erbium-doped fiber sources have a much better temperature stability than superluminescent diodes and resonant cavity lasers, there still is a need for a high power light source using an optical fiber structure with very little thermal drift and a high quantum efficiency.

It is therefore an object of the present invention to substantially improve the quantum efficiency and thermal dependence of superfluorescent fiber sources. It is a further object of the present invention to obtain optical sources with stable operating characteristics, having a compact size, a high efficiency and intrinsically low temperature sensitivity, that could be used in fiber sensors.

SUMMARY OF THE INVENTION

According to a first aspect of the present invention, there is disclosed a light source comprising an optical waveguide comprised of an active medium responsive to pumping with a pump signal at a pump wavelength to induce in said active medium emission of light, at least a portion of the emitted light propagating in a direction opposite that of the pump signal to provide a backward propagating signal, the length of said waveguide being selected so that the quantum efficiency of said backward signal is greater than 50%.

The pump source may be a laser diode. The optical waveguide may comprise a single-mode fiber doped with lasing material. The active medium preferably includes a three-level system, such as Erbium. The optical waveguide may comprise an optical fiber having an input end and an output end, and may have a reflector positioned proximate to the input end of the optical fiber. The reflector may be substantially reflective to the emitted radiation and substantially transmissive to the pump light. In another configuration, it can be substantially transmissive to the emitted radiation and substantially reflective to the pump light. It may comprise a dichroic mirror.

According to another aspect of the present invention, there is disclosed a light source comprising an optical waveguide comprised of an active medium responsive to pumping at a pump wavelength to induce in the active medium emission of a light signal, the emitted light signal comprising a forward signal and a backward signal propagating in opposite directions, the waveguide being characterized by an optimal length for which the forward signal is maximum, the length of the waveguide being selected greater than the optimal length.

The backward signal is preferably substantially greater than the forward signal. The active medium is preferably a three-level system, and the forward signal is substantially attenuated by ground state absorption. The quantum efficiency of the backward signal may be substantially greater than the quantum efficiency of the forward signal.

According to another aspect of the present invention, there is disclosed a light source comprising an optical waveguide comprised of an active medium, the waveguide having a forward propagation direction and a backward propagation direction, the waveguide being responsive to pumping at a pump wavelength in the backward propagation direction so as to induce in the active medium emission of a light signal, the length of the waveguide being selected so that substantially more emission is in the backward propagation direction than in the forward propagation direction. The pumping light preferably induces superfluorescent emission of light in the active medium and the light signal is preferably emitted at a second wavelength. The forward signal may be substantially zero.

According to another aspect of the present invention, there is disclosed an apparatus, comprising an interferometer; a pump light source that emits pump light; and a light source comprising an optical waveguide comprised of an active medium responsive to pumping at a pump wavelength to induce in the active medium emission of a light signal at a second wavelength, the emitted light signal comprising a forward signal and a backward signal propagating in opposite directions, the length of the waveguide being selected so that the quantum efficiency of the backward signal is greater than 50%. The interferometer preferably comprises a Sagnac interferometer. The optical waveguide may comprise an Erbium-doped single mode optical fiber.

According to a further aspect of the present invention, there is disclosed a method of manufacturing a light source comprising an optical waveguide comprised of an active medium, the method comprising the steps of optically coupling a pump source to the active medium at a pump wavelength to cause the active medium to emit a light signal, the emitted light signal comprising a forward signal and a backward signal which propagate in opposite directions; and selecting the length of the waveguide so that the quantum efficiency of the backward signal is greater than 50%.

The method of the present invention may comprise the step of selecting the active material of the active medium among the rare earth group, and more particularly among three-level systems, and may further comprise the step of selecting said length so that said forward signal is substantially zero.

DETAILED DESCRIPTION OF THE PREFERRED EMBODIMENT

Figure 1:
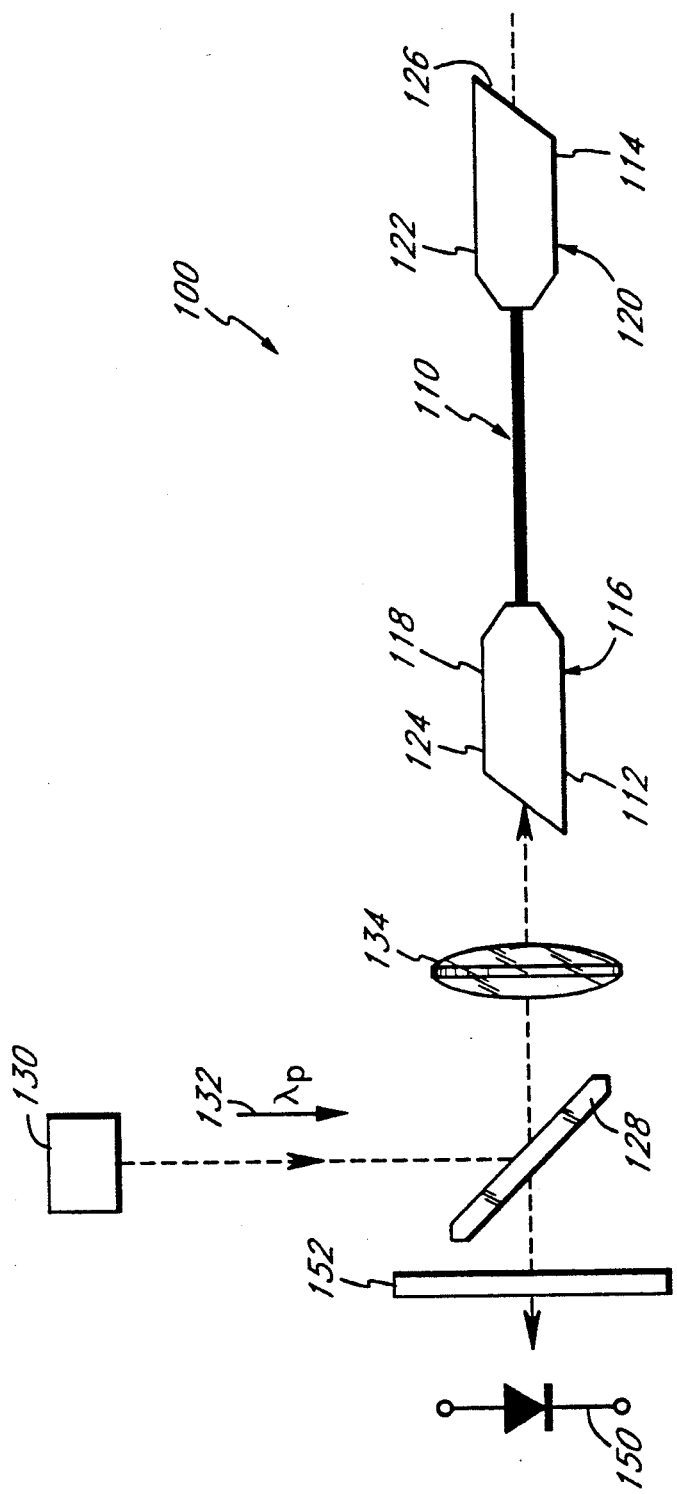
FIG. 1 illustrates an exemplary embodiment of a light source of the present invention comprising an Erbium-doped fiber.

Superfluorescent sources (SFS) refer to non-resonant fiber sources which output light emitted through amplified spontaneous emission (ASE). They typically comprise a waveguide such as a single strand of active fiber doped with a lasing material. The fiber is optically end-pumped at a sufficiently high level that a single pass gain becomes very large, so that the spontaneously emitted photons captured by the fiber core and traveling through the fiber experience a large amplification. The output power of the fiber can reach a significant fraction of the pump power launched into the fiber.

The optical fiber can be doped with a lasing material such as Erbium or Neodymium so as to produce output light through both ends of the fiber at one or several emission wavelengths. The optical fiber source produces emission in both the forward direction, i.e., in the direction of propagation of the pump signal and the backward direction, i.e., in the opposite direction of propagation of the pump signal. The simplest type of transition is the four-level laser transition which is well represented by the Nd:silica system. Pump photons are absorbed from the ground state to a much higher pump state. Relaxation occurs rapidly to a long lasting upper laser state. The laser transition occurs between this excited state and a lower laser state which should empty out rapidly back to the ground state. Because the lower laser state remains empty, signal absorption is not present in a four-level gain medium. In a four-level laser transition such as the 1060 nm $^4F_{3/2} \rightarrow ^4I_{11/2}$ transition in Nd-doped silica, the forward and backward output powers are substantially equal if the fiber loss is negligible compared to the single pass gain, which is generally the case.

The three-level transition of Er:silica is considerably more complex than the four-level transition described for Neodymium. In such a system, the ground state and the lower laser state are combined into a single state. Hence, both the upper and lower laser levels remain occupied according to Boltzman statistics. Signal emission and signal absorption are both possible. These two processes are often separated by defining separate emission and absorption cross-sections which are weighted by the probabilities of occupation of the levels acting in each case. Emission occurs from the occupied lower levels of the upper laser state to the lower laser state while absorption occurs from the occupied lower levels of the lower laser state to the upper laser state. In a three-level laser transition such as the 1550 nm $^4I_{13/2} \rightarrow ^4I_{15/2}$ transition in Er-doped silica, the forward signal is attenuated by ground state absorption more strongly than the backward signal and generally carries less power than the latter.

Thus, several important differences exist between the operation of Nd:SiO$_2$ fiber sources near 1060 nm and Er:SiO$_2$ fiber sources near 1550 nm. As indicated above, the 1060 nm $^4F_{3/2} \rightarrow ^4I_{11/2}$ transition in Nd-doped silica is a four-level laser transition whereas the 1550 nm $^4I_{13/2} \rightarrow ^4I_{15/2}$ transition in Er-doped fiber is a three-level laser transition. In the Er-doped fiber, the signal suffers from strong ground state absorption (GSA) when traveling through the unpumped fiber. A relatively large amount of pump power must be absorbed by the fiber just to create a population inversion and a net gain.

The second difference is that for several of the pump bands of Er:SiO$_2$ readily covered by standard laboratory lasers, in particular near 514.5 nm, 600 nm and 800 nm, the pump photons suffer from significant absorption from the upper laser state, a mechanism known as excited state absorption (ESA). This undesirable effect also results in an increased pump power requirement. However, two useful pump bands have been identified where pump ESA is negligible, namely near 980 and 1480 nm. For lack of a better pump source, early laboratory investigations operated devices at $\lambda_p = 514.5$ and 800 nm. More recently, devices have been pumped at either of the two ESA-free wavelengths using a dye laser or a Titanium Sapphire laser. See for example Oki, Monterey Conference Paper, and D. P. Bour et al., "980 nm Diode Laser for Pumping Erbium-Doped Fiber Amplifiers," IEEE Photon. Techno. Lett. 2, 3, 153-155 (March 1990), R. I. Laming et al., "Pumped Excited State Absorption in Erbium-Doped Fibres," Optics Letters 13, 12, 1084-1086 (Dec. 1988), P. R. Morkel, "Erbium-Doped Fibre Superfluorescent Source for the Fibre Gyroscope," Optical Fiber Sensors, Springer Proceedings in physics, Vol. 44, p. 143 (1989), P. F. Wysocki et al., "Broad Spectrum, Wavelength Swept Erbium-Doped Fiber Laser at 1550 nm," Opt. Lett. 15, 16, 879-881 (Aug. 1990), P. F. Wysocki et al., "1550 nm Broadband Fiber sources Pumped near 980 nm," Fiber Laser Sources and Amplifiers II, Proc. SPIE 1371 (1990), and P. F. Wysocki et al., "Spectral Characteristics of High Power 1550 nm Broadband Superluminescent Fiber Sources," IEEE Photon. Techno. Lett. 2,3, 178-180 (March 1990). All these articles are hereby incorporated by reference herein.

Theoretical expressions have been derived for the output power dependence on pump power, and for the threshold and conversion efficiency of SFS's doped with material having a four-level laser transition, for example in an article by M. J. F. Digonnet, "Analysis of a 1060-nm Nd:SiO$_2$ Superfluorescent Fiber Laser" J. Lightwave Technol., vol. 7, no. 7, pp. 1009-1015, 1989 and in another article by M. J. F. Digonnet, "Theory of Superfluorescent Fiber Lasers, " J. Lightwave Technol., vol. 4, no. 11, pp. 163-1639, 1986. Both articles are hereby incorporated by reference herein. Those theoretical expressions predict, as confirmed by experiments, that as the pump power is increased the output power increases at first slowly, then exponentially as the ASE becomes dominant, and finally linearly when the gain becomes saturated by the strong circulating signals. In the limit of very high pump power, the conversion efficiency S of these sources, defined as the slope of the linear output region, is given by:

$$S = \epsilon \frac{h\nu_s}{h\nu_p} \quad (1)$$

The terms $h\nu_s$ and $h\nu_p$ are the signal and pump photon energies, respectively and $\epsilon$ is a constant. The conversion efficiency is also referred as the quantum efficiency (QE) of the backward signal and of the forward signal. The quantum efficiency of the output signal is defined as the ratio of the number of photons in the output signal to the number of pump signal photons input to the fiber. Correspondingly, the quantum efficiency of the backward signal (respectively the forward signal) is defined as the ratio of the number of photons output by the backward (resp. forward) signal at an output end of the fiber to the number of pump signal photons input to the fiber. The quantum efficiency characterizes well the operation of a SFS. Several types of SFS's arrangements are possible. In a single pass device, both the forward and the backward signals pass once through the fiber. In a double pass device, either the backward signal or the forward signal is partially re-injected into the fiber by the reflecting end portion of the fiber and experiences amplification as it travels to the opposite end of the fiber. In the double pass SFS, the constant $\epsilon$ is less or equal to 1. Therefore, the high pump conversion efficiency approaches the ratio of $h\nu_s/h\nu_p$, i.e. essentially all the absorbed pump photons are transformed into output photons. For a single pass SFS, the constant $\epsilon$ is less or equal to $\frac{1}{2}$ in a four-level system. It may be greater than $\frac{1}{2}$ in a three-level system in accordance with the present invention. The conversion efficiency is half as large, since equal numbers of photons are generated in the forward and backward directions. Both configurations can therefore be operated at efficiencies comparable to that of a resonant fiber laser although the single pass source exhibits a higher threshold, a lower efficiency, and consequently a high pump power requirement. See for example M. J. F. Digonnet, "Theory of Superfluorescent Fiber Lasers," J. Lightwave Technol., vol. 4, no. 11, pp. 163-1639, 1986 and M. J. F. Digonnet and C. J. Gaeta "Theoretical Analysis of Optical Fiber Laser Amplifiers and Oscillators," Appl. Opt. 24, 3, 333-342 (Feb. 1985). Both articles are hereby incorporated by reference herein.

Despite significant differences in the details of their physics and operating conditions, SFS's based on three-level laser transitions should also exhibit substantial conversion efficiencies and high output power and efficiencies. See for example R. F. Kalman et al., "Modeling of 3-level Laser Superfluorescent Fiber Sources" Fiber Laser Sources and Amplifiers II, Proc. SPIE 1373 (1990). This article is hereby incorporated by reference herein. The major difference with four-level SFS's is that the forward and backward output powers are generally different because of ground state absorption (GSA). The signal is generated in the fiber region where the gain is positive, and attenuated where the gain is negative. In an end-pumped three-level fiber of sufficient length, the gain is positive over a finite region, near the pump input end, and negative towards the far end of the fiber. On the other end the backward signal is not affected by the far end of the fiber since it does not travel through it. The net result is that the forward signal is always smaller than the backward signal. The forward and backward signal output powers are similar only in highly pumped short fibers. As the fiber length is increased, the difference between the forward and backward signal powers increases.

Advantageously, along the negative gain region of the fiber where the forward signal is attenuated by GSA, some of the absorbed photons are also re-emitted via spontaneous emission. The fraction of re-emitted photons captured by the fiber core in the backward direction travels through the positive gain region of the fiber where it is amplified, and can contribute to a significant increase in the backward signal. This effect becomes stronger as the fiber length is increased. It is in fact so strong that for long enough fibers excited with a high enough pump power, a portion of the forward signal is converted into the backward signal, and conversion efficiency substantially greater than 50% can be obtained in the backward direction. This behavior is in sharp contrast with that of a single-pass four-level SFS, for which the conversion efficiency does not exceed 50% in either direction. Er:SiO$_2$ SFS's should therefore be more efficient than Nd:SiO$_2$ SFS's. The present invention uses and implements this unexpected effect.

FIG. 1 illustrates an exemplary embodiment of the present invention which can be advantageously used as a light source for a gyroscope as described in more detail hereinbelow. As illustrated, a fiber source 100 comprises an optical waveguide 110 that may be a single-mode optical fiber. In the embodiment shown in FIG. 1, the fiber 110 is formed of a silica glass that is doped with Erbium (Er) which emits output light at one or several emission wavelengths in response to a pump optical signal at a selected pump wavelength. For example, the optical fiber 110 may be doped with a concentration of Erbium in the range of 50 ppm to 2000 ppm. The optical fiber 110 of FIG. 1 is a conventional telecommunications type of optical fiber of SiO$_2$, doped with approximately 1600 ppm of Erbium. The optical fiber 110 used in the embodiment shown in FIG. 1 may be co-doped with Aluminum and Phosphorus. The exemplary optical fiber 110 has a core radius of approximately 2.2 microns and a cladding diameter of approximately 80 microns. The aperture number NA of the fiber shown in FIG. 1 is 0.2. Although an Erbium-doped optical fiber is preferable in the present invention, the optical fiber 110 can be doped with another suitable lasing material. The optical fiber 110 used in the embodiment of FIG. 1 is manufactured by AT&T Bell Lab, New Jersey. Other optical fibers are readily available, such as Erbium-doped fibers manufactured by GTE Inc.

The optical fiber 110 can absorb light at a multiplicity of absorption wavelengths. For example, at the absorption wavelength of 650 nm (Ar pump DCM dye laser), the rate of absorption is 5 dB/m for an Erbium-doped fiber having a concentration of 300 ppm of Erbium. See for example an article by Mears et al., "Low-noise Erbium-doped fiber amplifier operating at 1.54 μm." Electr. LeH. Vol. 23, 19, pp. 1026-1027, September 1987. When pumped with an optical signal at a pump wavelength in the absorption range of Erbium which is in the range of 500 nm to 1500 nm, at a sufficient intensity of the pump radiation, the Erbium doping emits light in an emission range of approximately 1528 nm to approximately 1580 nm, depending upon the pump wavelength and the pump intensity, as will be discussed more fully below. More specifically, the absorption peaks of Erbium are near 528 nm, 650 nm, 800 nm, 980 nm and 1490 nm. There are two peaks of emission at 1533 nm and 1559 nm. There is an additional emission of light at 1580 nm but such emission has a substantially lower intensity.

Referring again to FIG. 1, the optical fiber 110 has a first end 112 and a second end 114. A first end portion 116 of the optical fiber 110 proximate to the first end 112 may be enclosed within a first capillary tube 118 to provide support for the first end portion 116 and to provide a means for accurate alignment of the first end portion 116. Similarly, a second end portion 120 of the optical fiber 110 proximate to the second end 114 may be enclosed within a second capillary tube 122. Both the first end 112 and the second end 114 may be ground and polished so as to define planar surfaces 124, 126 inclined at an angle greater than 10° e.g., in the embodiment of FIG. 1, at approximately 15° with respect to the transversal axis of the first end portion 116 and the second end portion 120, respectively. The inclined planar surfaces 124 and 126 guarantee no reflection and hence no resonant structure. In the embodiment of FIG. 1, the planar surfaces 124, 126 minimize reflections estimated to be at a −60 dB level. The proximal end of the first capillary tube 118 is ground and polished at the same time as the first end 112 of the optical fiber 110 so that the proximal end of the first capillary tube 118 is coplanar with the planar surface 124. Similarly, the distal end of the second capillary tube 122 is ground and polished at the same time as the second end 114 of the optical fiber 110 so that the distal end of the second capillary tube 122 is coplanar with the planar surface 126. In the embodiment of FIG. 1, the detector 150 is located near the proximal end 112 of the fiber 110.

The optical fiber 110 at the concentration mentioned above has a length that is preferably greater than 0.5 meter and which may be increased to any length. The length of the fiber can be varied in accordance with the concentration of dopant. In the embodiment shown in FIG. 1, the length of the optical fiber may have three different values: 2.5 meters, 4.8 meters and 13.2 meters. Spectral properties of the output signal are substantially altered for greater lengths. The fiber length of the fiber 110 in FIG. 1 is longer than the optimal length for generating forward signal power for all pump power levels considered. As discussed above, this extra length serves three main purposes. First, the length of fiber beyond optimal produces signal absorption which reduces round trip gain and prevents accidental resonant lasing. Second, this length guarantees the absorption of more than 99% of the pump power across the entire pump band from 955 nm to 995 nm. Finally, since the backward signal is the desired output, a greater length for the fiber 110 advantageously reduces the forward signal. Any photons emitted in the forward direction are not available for emission in the backward direction. The forward signal serves only to saturate the gain for the backward signal. Those experimental observations will be confirmed by the theoretical analysis of the quantum efficiency of long fibers as discussed hereinafter.

The fiber source 100 preferably includes a first mirror 128 that is mounted proximate to the first end 112 of the optical fiber 110. In the embodiment shown in FIG. 1, the mirror 128 is inclined at an angle of 45° with respect to the horizontal. The mirror 128 is advantageously a dichroic mirror having substantially 100% reflectivity at a first range of optical wavelengths, corresponding to the wavelengths of the pump signal, and having substantially no reflectivity at a second range of wavelengths, corresponding to the wavelengths of the emitted signal. The dichroic mirror 128 filters out the pump light from the output light to be detected. The structure of such a dichroic mirror is well known in the art.

The fiber source 100 of the present invention further includes an optical pump source 130 which generates a pump optical signal represented by an arrow 132 at a wavelength $\lambda_p$. The pump source used in the embodiment of FIG. 1 is an Argon-ion pumped Ti:sapphire laser tunable across the entire pump band near 980 nm. Ti:sapphire lasers are readily available for experimental purposes. The pump band near 980 nm does not suffer from excited state absorption. Other available pump sources are, for example, a laser diode emitting at 1490 nm or at 980 nm. A laser diode emitting at 1490 nm is advantageous as the pump light wavelength is close to the output light wavelength. At this wavelength, there is also no excited state absorption, which increases the efficiency of conversion. A styryl-13 dye laser can also be used. This pump source emits radiation at a wavelength of 980 nm. Other pump sources can be selected that emit radiation at other wavelengths. For example, an Argon-ion laser emits radiation at 514 nm. This source, however, suffers from excited state absorption.

The optical pump source 130 is aligned with respect to the dichroic mirror 128 and the longitudinal axis of the first end portion 116 of the optical fiber 110 so that the pump optical signal 132 is reflected on the first dichroic mirror 128 and is introduced into the first end portion 116 of the optical fiber 110 via the first end 112.

The pump optical signal 132 may be focused on the longitudinal axis of the first end portion 116 of the optical fiber 110 by a first lens 134, as illustrated in FIG. 1. In the embodiment shown in FIG. 1, the lens is a 18 x objective with a measured coupling efficiency of 47%. The lens working distance in the embodiment of FIG. 1 was selected to be long enough to keep the reflections into the fiber 110 below −50 dB.

The pump optical signal 132 introduced into the first end portion 116 propagates in the optical fiber 110 towards the second end 114. As the pump optical signal 132 propagates towards the second end 114, the optical energy of the pump optical signal 132 is absorbed by the Erbium doping ions of the optical fiber 110, causing the ions to change state. When the ions relax (i.e., return to their original stable state), photons are emitted at an emission wavelength that is longer than the pump wavelength. This emission effect is known to the art and has been used advantageously to produce superfluorescent broadband sources by pumping an Erbium-doped fiber with a pump optical signal of sufficient intensity to cause spontaneous emission in a random manner so as to provide an output signal having a low temporal coherence. See, for example, U.S. Pat. No. 4,637,025. This patent is hereby incorporated by reference herein. Such superfluorescent light sources are specifically constructed so that the emitted light passes directly out of the first end or the second end of the optical fiber.

In the embodiment of FIG. 1, some of the spontaneously emitted light is initially directed toward the first end 112 of the optical fiber 110. This emitted light is referred to as the backward signal. Some of the spontaneously emitted light is also directed toward the second end 114 of the fiber. This emitted light is referred to as the forward signal.

The backward signal exits the first end 112 of the optical fiber 110, passes through the dichroic mirror 128 and is collected by the detector 150. In order to filter out any pump light that may be present in the output beam, the detector 150 may also comprise an optical filter 152 such as a gallium arsenide wafer.

The experimental results obtained with three different lengths of fiber in the embodiment of FIG. 1 indicate that it is possible to obtain high backward quantum efficiencies with long fibers. The forward-generated signal is strongly attenuated for fibers exceeding a couple of meters. In the embodiments of FIG. 1, the fiber 110 was longitudinally pumped at 976 nm. For the three lengths of fiber selected, the quantum efficiency measured was greater than 50%. The results are as follows:

| Length (m) | 13.2 | 4.8 | 2.5 |
| --- | --- | --- | --- |
| Pump power (mW) | 272 | 251 | 272 |
| Backward output power (mW) | 123 | 93 | 109 |
| Quantum efficiency (%) | >50 | >50 | >50 |

The quantum efficiency for the backward signal can reach values greater than 50%, unlike the four-level systems where the quantum efficiency cannot exceed 50% in either the backward direction or the forward direction.

The above results can now be best understood in the light of a theoretical model of a three-level superfluorescent fiber source.

COMPUTER MODEL OF A THREE-LEVEL SUPERFLUORESCENT FIBER SOURCE

The following analysis is based on a computer model of a three-level SFS and adequately predicts the important experimental observations described above. Though the various parameters values used in these results are for a particular Erbium-doped fiber, the conclusions are applicable to a broad range of waveguides.

Figure 2:
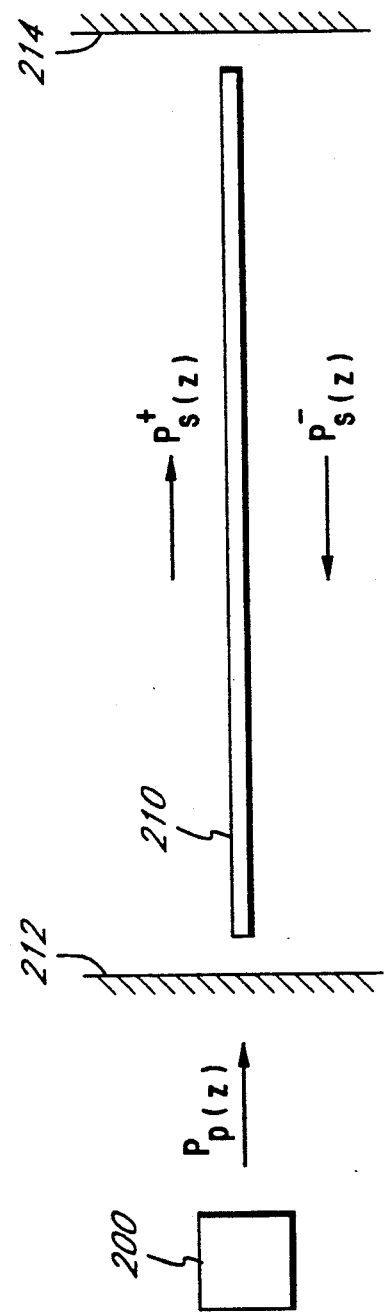
FIG. 2 is a diagram of a superfluorescent fiber source used in the modelization of a three-level system.

FIG. 2 schematically shows the model used in this analysis. It consists of a pump source 200, a doped fiber 210 and partial reflectors 212 and 214 having reflection coefficients R1 and R2 at the signal wavelength. In order to suppress resonant oscillation, the net round-trip gain, including reflection losses, must be well below unity. For the high single-pass gain cases of interest (40-50 dB), this generally implies an extremely low feedback level on at least one of the fiber ends.

The model assumes an ideal three-level laser system, in which each absorbed pump photon results in the transfer of an ion from the ground state to the excited state. Transitions between the excited state and the ground state are assumed to be purely radiative. This laser transition is also assumed to be homogeneously broadened. Depending on operating conditions and the fiber composition, a 3 dB gain linewidth can extend over 25 nm or more. The pump and signal waves exhibit characteristic modal profiles associated with the fiber parameters. The transverse spatial dependence can be expressed through the effective areas associated with the pump and signal modes. Additionally, the model allows for feedback from both ends of the SFS, which is essential to modeling the SFS in practical systems.

The behavior of an SFS is determined by the interaction between the population densities of the various electronic energy levels in the laser medium and the optical signals propagating in the fiber. Because the signal exists over a broad spectrum and experiences gain which is dependent on the optical signal frequency $\nu_s$, a general approach to describing the signal evolution along the fiber utilizes the power spectral densities (PSD's) of the forward ($S^+(\nu_s,z)$) and backward ($S^-(\nu_s,z)$) propagating signals, $$\frac{dS_s^\pm(\nu_s, z)}{dz} = \pm N_d \{\sigma_e(\nu_s) a(z) + \quad (2)$$

$$[1 - a(z)]\sigma_a(\nu_s)\} \frac{A_c}{A_s} S_s^\pm(\nu_s, z) + 2\sigma_e(\nu_a)$$

where $N_d$ is the dopant concentration, $\sigma_e(\nu_s)$ and $\sigma_a(\nu_s)$ are the signal emission and absorption cross sections, $A_c$ and $A_s$ are the core area and the effective signal cross-sectional area, and h is the Planck constant. The fraction of ions in the excited state is expressed by the parameter a(z), $$a(z) = \frac{N_2}{N_d} = \frac{\frac{P_p(z)}{I_{p\,sat}A_p} + \frac{\tau}{A_s} \int \sigma_e(\nu_s) \frac{S_s(\nu_s, z)}{h\nu_s} d\nu_s}{1 + \frac{P_p(z)}{I_{p\,sat}A_p} + \frac{\tau}{A_s} \int [\sigma_e(\nu_s) + \sigma_a(\nu_a)] \frac{S_s(\nu_s, z)}{h\nu_s} d\nu_s} \quad (3)$$

where $N_2$ is the upper laser level population density, $\tau$ is the spontaneous lifetime, $A_p$ is the effective pump cross-sectional area, and the total signal PSD is $S_s(\nu_s,z) = S_s^+(\nu_s,z) + S_s^-(\nu_s,z)$. The pump saturation intensity $I_{p\,sat}$ is given by $$I_{p\,sat} = \frac{h\nu_p}{\tau\sigma_p} \quad (4)$$

where $\nu_s$ is the pump optical frequency and $\sigma_p$ is the pump ground state absorption cross section. Since the pump can be assumed to be a narrowband signal, it is preferable to consider the pump power $P_p(z)$ rather than its PSD, whose evolution is governed by $$\frac{dP_p(z)}{dz} = -N_d \{\sigma_p[1 - a(z)] + \sigma_p' a(z)\} \frac{A_c}{A_p} P_p(z) \quad (5)$$

where $\sigma_p'$ is the pump excited state absorption cross section. The term involving $\sigma_p$ represents excitation of ions from the ground state to the pump level, which subsequently decay to the excited state. The second term represents absorption of pump photons by these excited state ions. See the article by P. R. Morkel and R. I. Laming, "Theoretical Modeling of Erbium-Doped Fiber Amplifiers with Excited-State Absorption," Opt. Lett., vol. 14, no. 19, pp. 1062-1064, 1989, which is hereby incorporated by reference herein. In Erbium, these ions quickly decay back to the excited state through various mechanisms which do not usefully contribute to the SFS operation. The net effect of this excited state absorption (ESA) is thus to waste pump photons, notably in regions of the fiber where the excited-state population is substantial. By pumping at appropriate wavelengths (notably around 980 nm and 1480 nm), the $\sigma_p'$ can be made so low as to be negligible. See for example the article by R. I. Laming, S. B. Poole, and E. J. Tarbox, "Pump Excited-State Absorption in Erbium-Doped Fibers," Opt. Lett., vol. 13, no. 12, pp. 1084-1086, 1988 and the article by E. Snitzer, H. Po, F. Hakimi, R. Tumminelli, and B. C. McCollum, "Erbium Fiber Laser Amplifier at 1.55 μm with Pump at 1.49 and Yb Sensitized Er Oscillator," in Tech. Dig. Optical Fiber Commun. Conf. (Washington, D.C.), 1988, post-deadline paper PD-2. Both articles are hereby incorporated by reference herein.

Equations (2)-(5) can be solved simultaneously through numerical integration. In an Erbium-doped fiber amplifier, the saturation characteristics are typically dominated by a unidirectional narrow linewidth signal, resulting in considerable computation simplification. In order to model the broadband ASE signals in a SFS, the evolution of multiple discrete spectral lines in both directions is simultaneously calculated using the fourth-order Runge-Kutta method. The presence of appreciable signals propagating in both directions considerably complicates the solution, since the numerical integration naturally proceeds in only a single direction. This results in a need to iteratively adjust the output backward signal levels $S^-(\nu_s,0)$ in order to meet the input backward boundary conditions $(S^-(\nu_s,L)=0$ in the absence of feedback). For n discrete lines, this results in a zero-finding problem for a n-dimensional system of non-linear equations, which is quite difficult and requires the use of a multidimensional Newton-Raphson technique. See for example the article by W. H. Press, B. P. Flannery, S. A. Teukolsky, and W. T. Vetterling, Numerical Recipes in C, New York; Press Syndicate of the University of Cambridge, 1988, which is hereby incorporated by reference herein.

THE MEAN WAVELENGTH APPROXIMATION

The signal spectra derive their shape from the wavelength dependence of the signal emission and absorption cross sections. In Erbium-doped fibers, though this spectral dependence varies somewhat with the codopants used, two major spectral features are observed consistently from fiber to fiber. See for example the article by E. Desurvire and J. R. Simpson, "Amplification of Spontaneous Emission in Erbium-Doped Single-Mode Fibers," J. Lightwave Technol., vol. 7., no. 5, pp. 835-845, 1989. This article is hereby incorporated by reference herein. In portions of the fiber with highly inverted populations, the gain is maximum around 1530 nm. As the inversion is decreased, the gain peak shifts to a region around 1550 nm.

For fibers into which high pump powers are most of the signal gain occurs in a relatively short length of fiber with a highly inverted population. This leads to a gain dominated by the signal absorption and emission cross sections around the 1530 nm gain peak. Under this condition, when it is desired to predict the total signal power output, independent of spectral characteristics, good agreement with the more rigorous wavelength dependent model can be obtained by considering a single "mean" signal wavelength. The problem can thus be reduced to the consideration of three optical waves as they propagate along the fiber: a unidirectional pump wave $P_p(z)$ and the two counterpropagating signal waves $P_s^+(z)$ and $P_s^-(z)$. Under this approximation, Equation (2) reduces to $$\frac{dP_p^\pm(z)}{dz} = \pm N_d \left\{ (\sigma_a + \sigma_s)a(z) - \sigma_a \right] \frac{A_c}{A_s} P_s^\pm(z) + \sigma_a a(z) P_o \right\} \quad (6)$$

where $\sigma_e$ and $\sigma_a$ are the cross sections of the mean signal wavelength $\nu_s$, $P_o$ is the spontaneous emission contribution given by $$P_o = 2h\nu_s \Delta\nu_s \quad (7)$$

where $\Delta\nu_s$ is the gain linewidth and the factor of 2 accounts for the two orthogonal polarization states into which spontaneous emission occurs. The expression for $a(z)$ of Equation (3) reduces to $$a(z) = \frac{\frac{P_p(z)}{I_{p\,sat}A_p} + \frac{P_p(z)}{I_{sa\,sat}A_p}}{1 + \frac{P_p(z)}{I_{p\,sat}A_p} + \frac{P_p(z)}{I_{s\,sat}A_p}} \quad (8)$$

where the additional saturation intensities associated with the signals are $$I_{s\,sat} = \frac{h\nu_s}{\tau(\sigma_s + \sigma_a)} \quad (9)$$

$$I_{sa\,sat} = \frac{h\nu_s}{\tau\sigma_a}$$

The results presented below use this simplified mean wavelength model. This was done to allow more straightforward physical intuition into the operation of three-level SFS's. The fiber parameters are those presented in an article by E. Desurvire, C. R. Giles, and J. R. Simpson, "Gain Saturation Effects in High-Speed, Multichannel Erbium-Doped Fiber Amplifiers at $\lambda=1.53$ microns," J. Lightwave Technol., vol. 7, no. 12, pp. 2095-2104, 1989. They are listed in the following table.

| Parameter | Value | Comment |
|---|---|---|
| $N_d$ | $6.85 \times 10^{-25} m^3$ | Much higher than typical fiber |
| $r_c$ | 2.2 $\mu$m | Core radius |
| $r_s$ | 3.37 $\mu m^2$ | Effective signal radius |
| $r_p$ | 2.24 $\mu m^2$ | Effective pump radius |
| NA | 0.2 | Numerical aperture |
| $\tau$ | 12 ms | Flourescence lifetime |
| $\lambda_s$ | 1.53 $\mu$m | "Average" wavelength |
| $\lambda_p$ | 0.98 $\mu$m | Pump wavelength |
| $\sigma_c$ | $7.4 \times 10^{-25} m^3$ | At $\lambda_s = 1.53$ nm |
| $\sigma_a$ | $4.4 \times 10^{-25} m^3$ | At $\lambda_s = 1.53$ nm |
| $\sigma_p$ | $1.75 \times 10^{-25} m^3$ | At $\lambda_p = 1.53$ nm |
| $\Delta\nu_s$ | $3.2 \times 10^{12}$ Hz | $\Delta\lambda_s = 25$ nm |
| $A_p I_{p\,sat}$ | 1.47 mW | Calculated from the above values |
| $A_s I_{s\,sat}$ | 0.328 mW | Calculated from the above values |
| $A_s I_{sa\,sat}$ | 0.879 mW | Calculated from the above values |
| $A_s I_{se\,sat}$ | 0.523 mW | Calculated from the above values |
| $P_o$ | 0.832 $\mu$W | Calculated from the above values |

REGIME OF SFS OPERATION FOR LONG FIBERS

To obtain high quantum efficiencies from SFS's, it is necessary to pump at high levels ($P_p$ much greater than $I_{p\,sat}A_p$). Under this condition, the SFS operates in one of several regimes depending on its length. Because the present invention utilizes long fibers, the following analysis will only consider long fibers.

Referring again to FIG. 2, as the fiber length is increased, there is a decreasing amount of pump power at the distal end 214 of the fiber 210. The fiber length for which the signal gain at the distal end is zero produces the maximum forward output power; this length can be referred to as the "optimal" length for the forward signal. Equation (6) can be used to show that this occurs where $P_p(L) = I_{p\,sat}A_p \sigma_a/\sigma_e$.

As the fiber length is increased beyond optimum, the pump signal rapidly decays to negligible levels resulting in negative gain in this additional length. It might be assumed that this additional length would have no effect on the backward power level, since there are essentially no pump photons to populate the excited state. This would be true of a four-level system, where the pump signal's absence would imply that the excited state population was zero. However, in a three-level system, the excited state can be populated by ground state signal absorption, though not sufficiently to produce positive gain. Some of these excited state ions are stimulated downward by the forward signal itself. However, others decay spontaneously and are captured by the backward propagating mode. These photons act as an additional "input" signal in the backward direction, and are strongly amplified once they reach the positive gain region. This results in an increase in backward power output over the shorter fiber case.

Of these backward traveling spontaneous photons, those which originate deeper in the negative gain region are less likely to reach the positive gain region and are thus less likely to contribute to the backward output. Additionally, the forward signal power is larger closer to the optimum length. The largest contribution from this effect thus comes from the region just beyond the optimum length. As the fiber length is increased beyond the optimum length, there should be expected decreasing contributions from this effect per unit length added, and the backward power should approach an asymptote.

Figure 3:
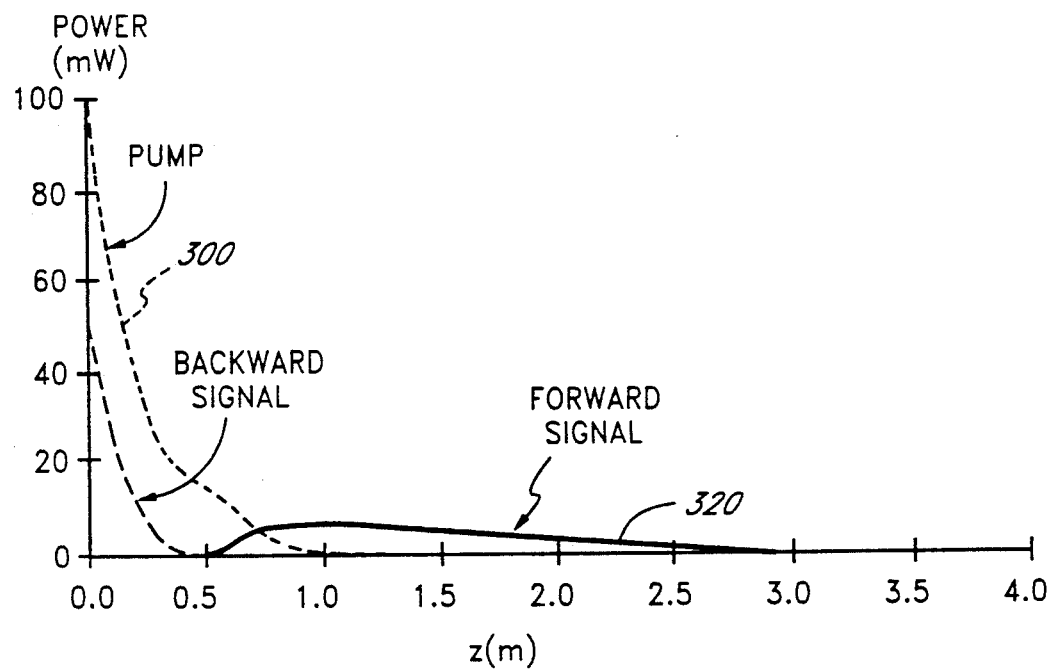
FIG. 3 represents the signal and pump evolution characteristics for a 4.0 m long fiber and 100 mW of input pump as a function of the fiber length.
Figure 4:
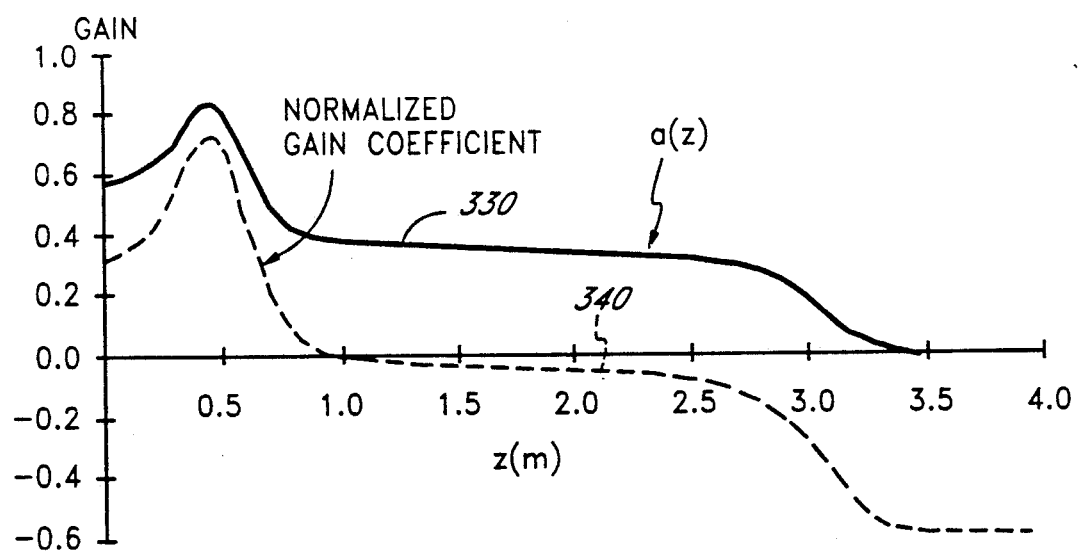
FIG. 4 is a plot of the population inversion parameter a(z) and normalized signal gain coefficient $(N_2\sigma_e - N_1\sigma_a)/N_d\sigma_e$ as a function of the fiber length.

Reference is now made to FIG. 3 which illustrates the signal and pump evolution characteristics for a 4.0 meter long fiber and 100 mW of input pump. In FIG. 3, the signal power and the pump power in mW are plotted as a function of the length of the fiber z in meters. The pump curve is designated by the numeral 300, whereas the backward and forward signal powers are respectively characterized by the numerals 310 and 320. Reference is also made to FIG. 4 which represents the population inversion parameter a(z) and the normalized signal gain coefficient $(N_2\sigma_e - N_1\sigma_a)/N_d\sigma_e$ as a function of the fiber length z in meters. The two curves are designated by the numerals 330 (population inversion parameter) and 340 (normalized signal gain coefficient). FIG. 4 shows that beyond approximately 1 meter the gain is negative, whereas FIG. 3 indicates that the forward power decreases beyond 1 meter. This decrease is relatively slow, since much of the absorbed signal power is recaptured through stimulated emission. The gradual slope is due purely to spontaneous emission, which in this case is the only source of "loss." FIG. 4 clearly shows that the effect of the signal on the population densities is clearly evident in the fiber region beyond 3 meters, where the excited state population approaches zero as the forward signal power drops below $I_{s\ sat}A_s$.

QUANTUM EFFICIENCY

As noted above, the quantum efficiency (QE) of a SFS is an important parameter. Because the signal and pump power levels can vary widely over the length of the fiber, it is useful to consider a position-dependent incremental quantum efficiency, defined as $$\eta^{\pm}(z) = \pm \frac{v_p dP_z^{\pm}/dz}{v_s dP_p/dz} \quad (10)$$

Assuming that there is no excited stage absorption, each absorbed pump photon results in the transfer of an electron from the ground state to the excited state. From this excited state, decay back to the ground state can occur through two mechanisms, stimulated and spontaneous emissions. Spontaneous emission is isotropic, and thus only a small fraction (typically on the order of $10^{-3}$) is captured by the guided signal mode propagating in each direction of the fiber; the quantum efficiency of this decay mechanism is thus very low. Stimulated emission is induced by signal photons propagating in the fiber eigenmodes. Because these stimulated photons are spatially coherent with the inducing signal, all photons produced by stimulated emission are captured by the fiber resulting in unity QE for this process.

At low signal levels, excited-to-ground state transitions are dominated by spontaneous emission and the quantum efficiency into the guided signal modes is thus very low. By contrast, as signal levels appreciably exceed $P_s = A_s I_{s\ sat}$, the transitions to the ground state are dominated by stimulated emission and the quantum efficiency approaches unity.

The total quantum efficiency in each direction is particularly important. It is defined as $$\eta_T^{+} = \frac{v_p P_s^{+}(L)}{v_s P_p(O)}, \quad \eta_T^{-} = \frac{v_p P_s^{-}(O)}{v_s P_p(O)} \quad (11)$$

and related to the incremental quantum efficiency by $$\eta_T^z = \frac{1}{P_p(O)} \int_{P_p(L)}^{P_p(O)} \eta^z(z) dP_p \quad (12)$$

The examination of the signal evolution characteristics for various fiber lengths indicates that the forward and backward signals are never simultaneously large. In the maximum gain region, the signals are both small and the incremental quantum efficiency is thus small. On either side of this region, the signals become large, resulting in both high quantum efficiencies and lower gains. It appears that signal saturation (and thus reduced gain) and high quantum efficiency both occur for large signal levels. This would indicate that an SFS should be operated in a highly saturated mode to obtain high quantum efficiency.

Figure 5:
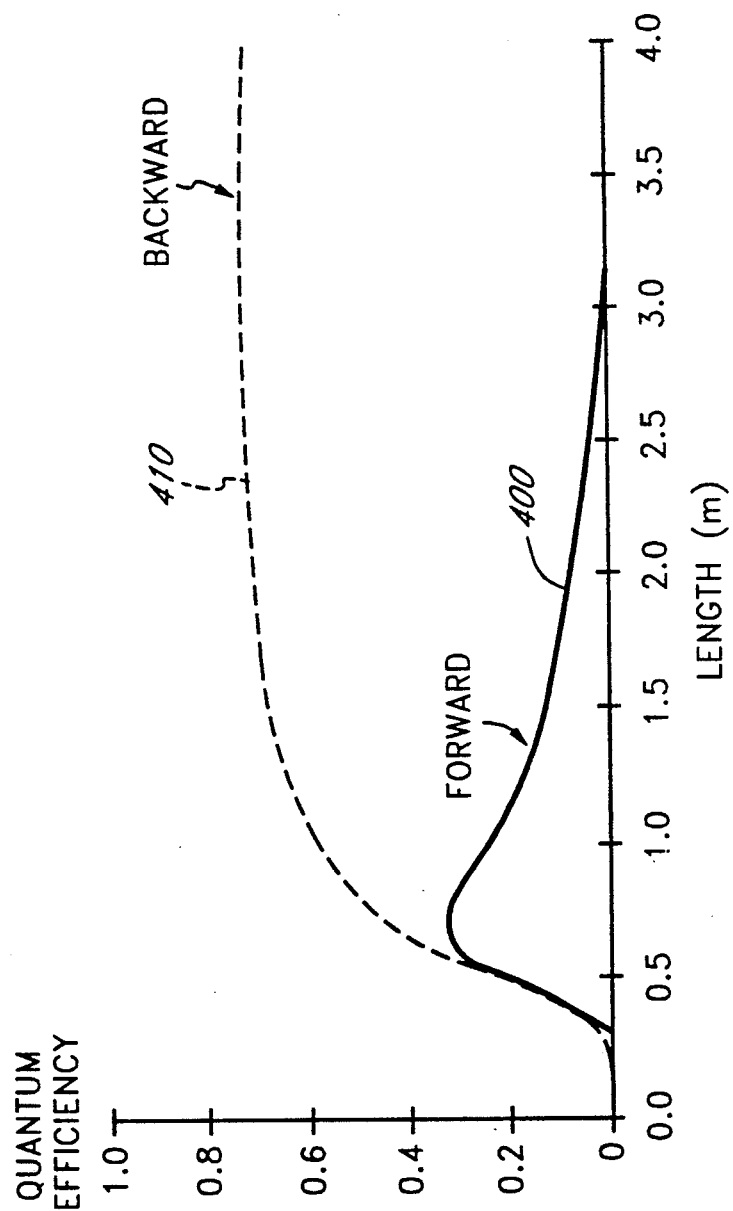
FIG. 5 is a graph of the forward and backward quantum efficiency as a function of fiber length for 100 mW of input pump power.

As noted above, the backward signal (and thus the backward QE) should approach an asymptote as the fiber length is increased. Reference is now made to FIG. 5 which graphically illustrates the forward and backward quantum efficiency (curves 400 and 410 respectively) as a function of fiber length for 100 mW of input pump power. The backward QE curve 410 asymptotically approaches 0.7. At the same time, the forward power curve 400 tends to zero for long fibers as is expected due to the glossy section of fiber. By contrast, the equal forward and backward output power levels of a fourlevel system imply that neither the forward or backward quantum efficiency can exceed 0.5.

Figure 6:
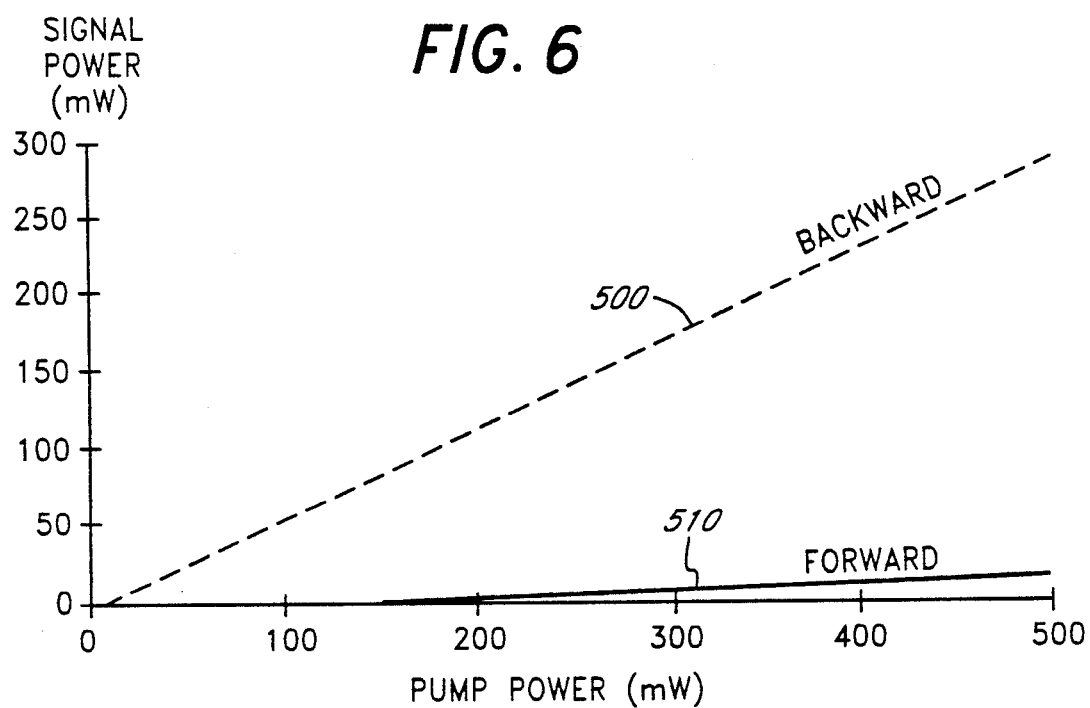
FIGS. 6 and 7 are graphic representations of the signal power and of the quantum efficiency as a function of input pump power for a 4 m long fiber.
Figure 7:
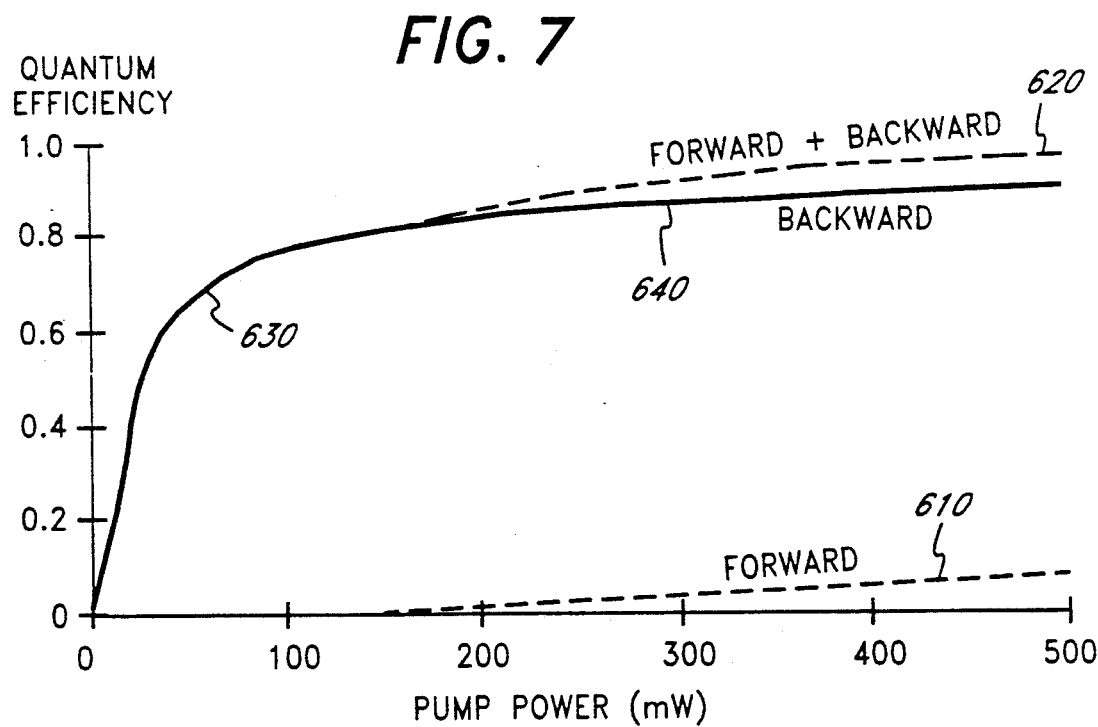

Reference is now made to FIGS. 6 and 7 which respectively represent the signal power in mW and the quantum efficiency as a function of input power in mW for a 4 meter long fiber. In FIG. 6, the backward signal curve and the forward signal curve are designated by the numerals 500 and 510 and are substantially linear. The backward signal 500 exhibits a very low threshold, above which the signal power increases linearly with pump power. The forward signal 510 exhibits a much higher threshold and a much lower slope efficiency, both consequences of the power transfer mechanism discussed above.

In FIG. 7, three quantum efficiency curves are plotted: the backward QE curve 600, the forward QE curve 610 and the sum of the backward and forward QE 620. The low backward QE observed at low pump power levels occurs because there is insufficient gain to achieve a highly saturated signal. As the pump power is increased to $P_p >> A_p I_{p\ sat}$, the backward QE first increases rapidly as indicated by the region 630, but then encounters a region of slow increase to an asymptotic efficiency of approximately 92% (portion 640 of the curve 600). The backward QE does not reach unity for the following reason. Even in the high pump power long fiber limit, the forward power reaches an appreciable peak value within the fiber. Though some of this forward signal is subsequently converted to backward signal through the mechanism discussed above, this transfer is dominated by spontaneous emission, and is thus one of inherently low quantum efficiency. The backward quantum efficiency must therefore fall short of unity by an amount related to this peak forward signal level.

The above general model of a three-level superfluorescent source adequately predicts the experimental observations obtained in the present invention. This model considers fully general large signal conditions. Through the use of this numerical model, the evolution of the various waves along the fiber can be examined as a function of various parameters, notably the pump power level and fiber length; experimentally, only the power levels at the two fiber ends can be measured. The model presented also predicts the quantum efficiencies measured in the present invention and in particular demonstrates that the presence of ground state signal absorption in a three-level system results in backward quantum efficiencies of 90% or more for long fibers driven at high pump power levels. This is quite different from the fourth-level SFS case, where the quantum efficiency in either direction cannot exceed 50%. The present invention advantageously uses this unexpected characteristic of three-level systems.

SENSOR APPLICATIONS

Figure 8:
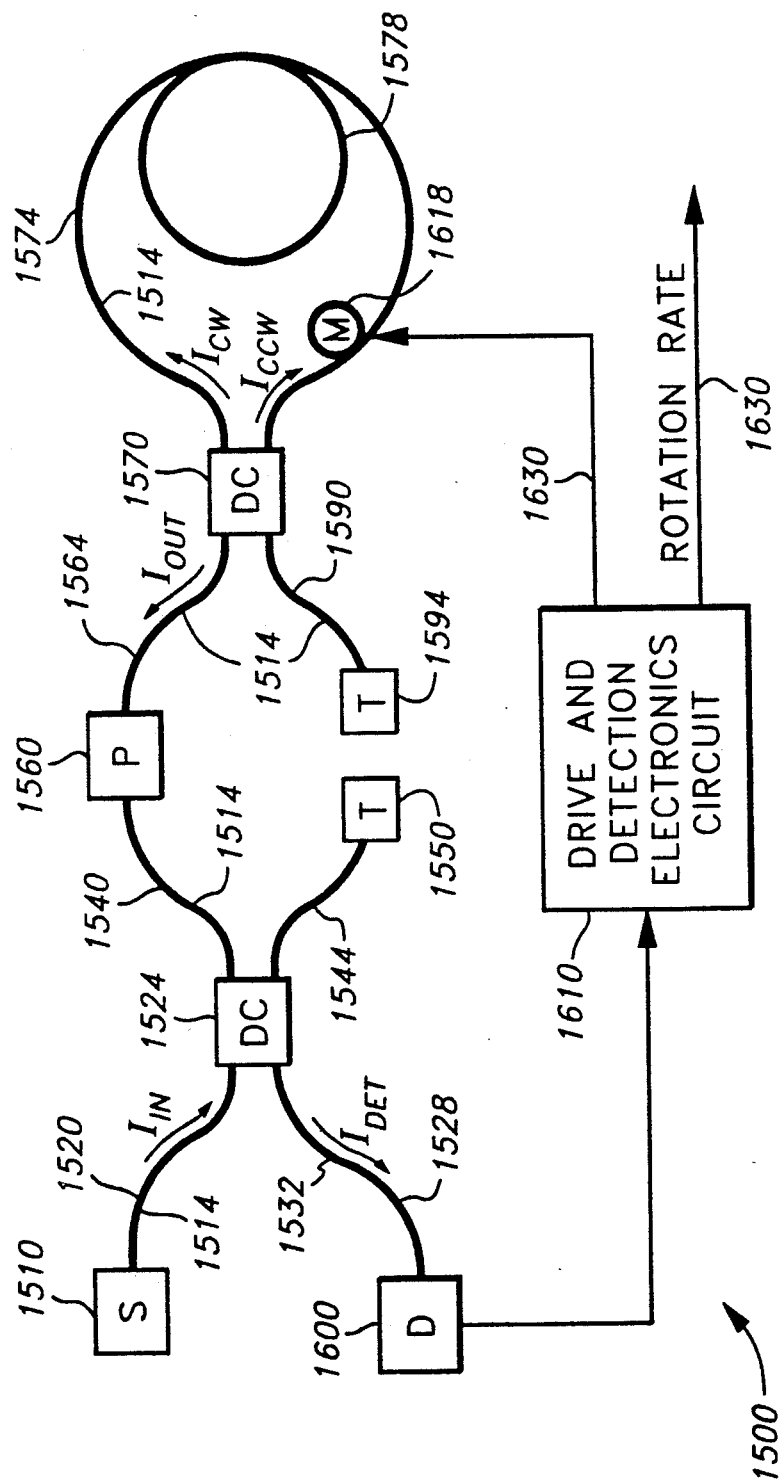
FIG. 8 represents an exemplary rotation sensor using the light source of the present invention.

The source of the present invention is particularly useful as a broadband optical source for an optical interferometer sensor such as a rotation sensor. An exemplary rotation sensor 1500 that can be advantageously used in combination with the source of the present invention is illustrated in FIG. 8. The rotation sensor 1500 comprises a Sagnac interferometer which includes a light 35 source (S) 1510 which provides an optical input signal $I_{IN}$, represented by an arrow. The light source (S) is advantageously the source of the present invention, for example the embodiment of FIG. 1. The input signal $I_{IN}$ may be the backward signal referred to in connection with the description of FIG. 1. It is coupled to a first optical waveguide 1514 such as a single-mode birefringent optical fiber. The first optical fiber 1514 includes a first optical fiber segment 1520 that serves as the input to the rotation sensor 1500. The first optical fiber segment 1520 provides a propagation path to a first optical directional coupler (DC) 1524, which, in preferred embodiments of the rotation sensor 1500, is constructed by juxtaposing two fibers. Details of such a coupler are disclosed in U.S. Pat. Nos. 4,493,528; 4,536,058; 4,564,262; and 4,601,541. These patents are hereby incorporated by reference herein. Those skilled in the art will appreciate that integrated optical couplers may also be utilized.

As set forth in the referenced patents, the first optical fiber segment 1520 is connected to one port of the first directional coupler 1524. The first directional coupler 1524 is formed by juxtaposing a second optical waveguide 1528 with first optical waveguide 1514. The second optical waveguide 1528 may also be a birefringent single-mode optical fiber. The second optical fiber 1528 includes a second optical fiber segment 1532 connected to an adjacent port of the first directional coupler 1524.

The first directional coupler 1524 has two additional ports, one of which is connected to a third optical fiber segment 1540 and the other of which is connected to a fourth optical fiber segment 1544.

In preferred embodiments of the rotation sensor 1500, the first directional coupler 1524 is constructed so that approximately 50% of the optical energy propagating in the first optical fiber segment 1520 from the light source 1510 towards the first directional coupler 1524 is directly transmitted to the third optical fiber segment 1540 and approximately 50% of the optical energy is coupled to the fourth optical fiber segment 1544. It should be understood that the first directional coupler 1524 is bidirectional in that optical energy propagating in the third optical fiber segment 1540 toward the first directional coupler 1524 is divided substantially equally between the first optical fiber segment 1520 and the second optical fiber segment 1528.

The fourth optical fiber segment 1544 is terminated by a first light-absorbing terminator (T) 1550. The first light-absorbing terminator 1550 absorbs substantially all the optical energy incident on it from the fourth optical fiber segment 1544 so that substantially no light is reflected back towards the first directional coupler 1524.

The third optical fiber segment 1540 provides a propagation path from the first directional coupler 1524 to a polarizer (P) 1560. Those skilled in the art will recognize that the polarizer is advantageous in that it reduces certain types of phase errors. If no polarizer is used, reduction of phase errors may be achieved through use of unpolarized light, as described in U.S. Pat. No. 4,529,312 and U.S. Pat. No. 4,634,282. These patents are hereby incorporated by reference herein. The polarizer can be constructed in accordance with a number of different embodiments, and is advantageously constructed in accordance with U.S. Pat. No. 4,386,822. This patent is hereby incorporated by reference herein. The polarizer 1560 is further connected to a fifth optical fiber segment 1564 such that light incident to the polarizer 1560 from the third optical fiber segment 1540 is output from the polarizer 1560 on the fifth optical fiber segment 1564. As is known to one skilled in the art, a single-mode optical fiber, such as the first optical fiber 1514, typically propagates light in first and second orthogonal polarization modes. The polarizer 1560 operates to block the light in one of the two polarization modes (e.g., the second polarization mode) so that the light propagating in the fifth optical fiber segment 1564 away from the polarizer 1560 comprises light in substantially only the first polarization modes (i.e., polarized light).

The polarized light from the polarizer 1560 propagates via the fifth optical fiber segment 1564 to a port of a second directional coupler (DC) 1570. The second directional coupler 1570 couples the light to a sixth optical fiber segment 1574 of the first optical fiber 1514. The sixth optical fiber segment 1574 is formed into a loop 1578 which lies in a plane generally perpendicular to the axis around which the loop is to be rotated. The sixth optical fiber segment 1574 returns to an adjacent port of the second directional coupler 1570 which thus closes the loop 1578. The first optical fiber 1514 extends from the second directional coupler 1570 to form a seventh optical fiber segment 1590. The seventh optical fiber segment 1590 is terminated by a second light-absorbing terminator (T), an optical detector (D) 1600 which detects the intensity of the optical energy in the second optical fiber segment 1528 and thus detects the intensity of the combined optical energy from the loop 1578. The detector 1600 provides an electrical output signal on a line 1604 that is responsive to the detected intensity. As is well known in the art, the intensity of the combined optical energy from the loop 1578 depends upon the relative phases of the two counterpropagating optical signals, which in turn depends in part upon the rotation rate of the loop 1578.

Various apparatuses and techniques for converting the detected optical intensity to an output signal representing the magnitude and angular direction of rotation are disclosed in the aforementioned U.S. Pat. No. 4,410,275; U.S. Pat. No. 4,456,377; U.S. Pat. No. 4,487,330; U.S. Pat. No. 4,634,282; and U.S. Pat. No. 4,637,722. These patents are hereby incorporated by reference herein. For example, a drive and detection electronics circuit block 1610 is illustrated. The drive and detection electronics circuit block 1610 provides an electrical output signal on a line 614 which is coupled to a phase modulator M) 1618. The phase modulator 1618 is coupled to the sixth optical fiber segment 1574 at a position offset from the center of the loop 578. The drive and detection electronics circuit block 1610 drives the phase modulator 1618 with a specific frequency that is selected to modulate the phase of the two counterpropagating optical signals $I_{cw}$ and $I_{ccw}$. The drive and detection electronics circuit block 1610 further uses the specific frequency to synchronously demodulate the electrical representation of the optical output signal on the line 1604 to provide an electrical output signal on a line 1630 that represents the rotation rate of the loop 1578. Additional details of the operation of the rotation sensor can be found in the aforementioned U.S. Pat. No. 4,410,275; U.S. Pat. No. 4,456,377; U.S. Pat. No. 4,487,330; U.S. Pat. No. 4,634,282; and U.S. Pat. No. 4,637,722. These patents are hereby incorporated by reference herein. While the rotation sensor depicted in FIG. 8 is in closed loop configuration, it will be understood that other configurations may be used, such as described in U.S. Pat. No. 4,779,975 or in application Ser. No. 401,225, filed on Aug. 31, 1989 or in application Ser. No. 565,255, filed on Aug. 9, 1990, both assigned to the assignee of this application. This patent and these patent applications are hereby incorporated by reference herein. While single-mode fibers have been described in connection with the rotation sensor 1500 of FIG. 8, it will be apparent to a person skilled in the art that multimode waveguides can also be used.

FEEDBACK EFFECTS

When used as a source in a system, the consideration of the effects of feedback into the SFS becomes important. This is particularly an interferometer sensor, where the Sagnac loop may act as a mirror. Referring to FIG. 8, the Sagnac loop may reflect 10% or more of the light coupled into the loop back into the source 1510.

Due to their high single-pass gain, SFS's are sensitive to feedback effects. Though the substantial signal saturation effects in these fibers tend to moderate feedback sensitivities, they are still sensitive to feedback in the range of −30 dB, which is exceeded in some applications.

Using the computer model presented above, it is possible to calculate how backward signal feedback affects both the forward and backward signals. The effect of spontaneous emission is essentially to continuously inject a signal $P_O$ along the fiber in each direction. As the signal which is fed back to the fiber approaches $P_O$, the signal power levels may change.

Figure 9:
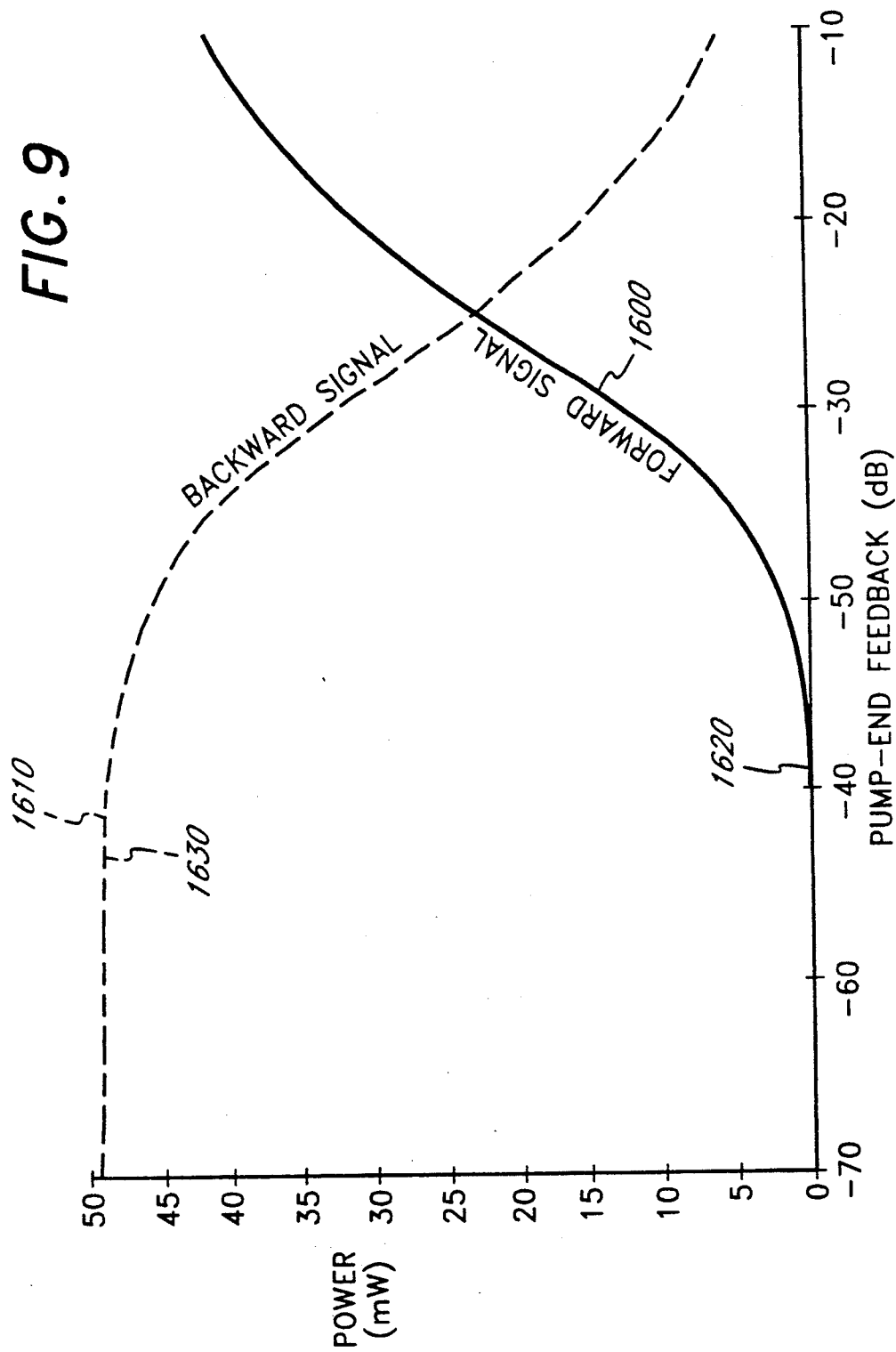
FIG. 9 is a plot of the forward and backward signal power as a function of the pump-end feedback.

Reference is now made to FIG. 9 which is a plot of the forward and backward signal power in mW as a function of the pump-end feedback R1. The feedback R1 is the reflection coefficient of the end portion 212 of the fiber 210 of FIG. 2 and is defined as the external power reflection back into the guided fiber mode. The feedback R1 affects the forward and backward output signal levels, represented by the curves 1600 and 1610. In this simplified model, the feedback coefficient R2 of the other end of the fiber 210 in FIG. 2 is supposed to be zero. It can be found that $R_1 P_s^-(0) = P_O$ for $R_1 = 1.7 \times 10^{-5} = -47$ dB. At this feedback level, there is indeed a small change in the output power levels as indicated by the numeral 1620 for the curve 1600 (forward signal) and the numeral 1630 for the curve 1610 (backward signal). However, the highly saturated gain moderates the effects of input signal variations on output signal levels, and therefore an additional 10 dB of feedback is required to produce large changes in the power levels. This sensitivity to feedback suggests that a fiber gyroscope source using a SFS may advantageously comprise an optical isolator to reduce feedback into the SFS. Feedback may also produce notable changes in the signal spectra. By intentionally feeding back a large fraction of the light into either of the ends of a fiber which is close to optimum, it may be possible to obtain a very high QE source where the QE is near 100%. In the limit of 100% feedback from one side, the configuration of the source is the same as that of a double pass SFS. Unfortunately, such a source is more susceptible to resonant oscillation due to external reflections and may require stringent optical isolation in practical cases.

Various embodiments of a optical fiber light source have been described above. Although the invention has been described with reference to these specific embodiments, the descriptions have been illustrative of the invention and are not intended to be limiting. In particular, the fiber source of the present invention can be doped with any other rare-earth suitable material. The embodiments of the present invention can also be used as amplifiers or as narrow band light sources. Various other modifications and applications may occur to those skilled in the art without departing from the true spirit and scope of the invention as defined in the appended claims.

What is claimed is:

1. An apparatus comprising a light source coupled to input light to an optical device, said light source comprising an optical waveguide comprised of an active medium responsive to pumping with a pump signal at a pump wavelength to induce in said active medium emission of light, at least a portion of the emitted light propagating in a direction opposite that of the pump signal to provide a backward propagating signal, the length of said waveguide being selected so that the quantum efficiency of said backward signal is greater than 50%, said light source being coupled to input said backward signal to said optical device.

2. A light source as claimed in claim 1, wherein said pump source is a laser diode.

3. A light source as claimed in claim 1, wherein said optical waveguide comprises a single-mode fiber doped with lasing material.

4. A light source as claimed in claim 1, wherein said active medium includes a three-level system.

5. A light source as claimed in claim 1, wherein said active medium includes Erbium.

6. A light source as claimed in claim 1, wherein said waveguide comprises an optical fiber having an input end and an output end, and having a reflector positioned proximate to said input end of said optical fiber.

7. A light source as claimed in claim 6, wherein said reflector is substantially reflective to said emitted radiation and substantially transmissive to said pump light.

8. A light source as claimed in claim 6, wherein said reflector is substantially transmissive to said emitted radiation and substantially reflective to said pump light.

9. A light source as claimed in claim 6, wherein said reflector comprises a dichroic mirror.

10. An apparatus comprising a light source coupled to input light to an optical device, said light source comprising an optical waveguide comprised of an active medium responsive to pumping with a pump signal at a pump wavelength to induce in said active medium emission of a light signal, said emitted light signal comprising a forward signal and a backward signal propagating in opposite directions, said backward signal propagating in a direction opposite that of said pump signal, said waveguide being characterized by an optimal length for which the forward signal is maximum, the length of said waveguide being substantially greater than said optimal length, said backward signal being input to said optical device so that said optical device receives said backward signal.

11. A light source as claimed in claim 10, wherein said backward signal is substantially greater than said forward signal.

12. A light source as claimed in claim 10, wherein said active medium is a three-level system.

13. A light source as claimed in claim 10, wherein said forward signal is substantially attenuated by ground state absorption.

14. A light source as claimed in claim 10 wherein the quantum efficiency of said backward signal is substantially greater than the quantum efficiency of said forward signal.

15. An apparatus comprising a light source coupled to input light to an optical device, said light source comprising an optical waveguide comprised of an active medium, said waveguide having a forward propagation direction and a backward propagation direction, said waveguide being responsive to pumping with a pump signal at a pump wavelength so as to induce in said active medium emission of a light signal, said backward propagation direction being opposite that of said pump signal, the length of said waveguide being selected so that substantially more emission is in said backward propagation direction than in said forward propagation direction, said light signal propagating in said backward direction being input to said optical device so that said optical device receives said backward propagating light signal.

16. A light source as claimed in claim 15, wherein said pumping light induces superfluorescent emission of light in said active medium.

17. A light source as claimed in claim 15, wherein said light signal is emitted at a second wavelength.

18. A light source as claimed in claim 15, wherein said forward signal is substantially zero.

19. An apparatus comprising:
an interferometer;
a pump light source that emits pump light at a pump wavelength; and
a light source comprising an optical waveguide comprised of an active medium responsive to pumping at said pump wavelength to induce in said active medium emission of a light signal at a second wavelength, the emitted light signal comprising a forward signal and backward signal propagating in opposite directions, said backward signal propagating in a direction opposite that of said pump light, the length of said waveguide being selected so that the quantum efficiency of said backward signal is greater than 50%, said light source being coupled to said interferometer such that said backward signal is input to said interferometer.

20. An apparatus as claimed in claim 19, wherein said interferometer comprises a Sagnac interferometer.

21. An apparatus as claimed in claim 19, wherein said optical waveguide comprises an Erbium-doped single mode optical fiber.

22. A method of manufacturing a light source comprising an optical waveguide comprised of an active medium, said method comprising the steps of:
optically coupling a pump source to pump said active medium with a pump signal at a pump wavelength to cause said active medium to emit a light signal comprising a forward signal and a backward signal which propagate in opposite directions, said backward signal propagating in a direction opposite that of said pump signal;
selecting the length of the waveguide so that the quantum efficiency of said backward signal is greater than 50%; and
inputting said backward signal to an optical device coupled to receive said backward signal.

23. A method of manufacturing a light source as defined in claim 22, further comprising the step of selecting the active material of the active medium among the rare earth group.

24. A method of manufacturing a light source as claimed in claim 22, further comprising the step of selecting said length so that said forward signal is substantially zero.

25. A light source as claimed in claim 1, wherein said active medium includes a three-level system and wherein said pump signal induces superfluorescent emission of light in said active medium.

26. A light source as claimed in claim 1, wherein said optical device comprises an interferometer.

27. A light source as claimed in claim 10, wherein said active medium includes a three-level system and wherein the emission of light induced in said active medium in response to said pumping is superfluorescent.

28. A light source as claimed in claim 10, wherein said optical device comprises an interferometer.

29. A light source as claimed in claim 15, wherein said active medium includes a three-level system and wherein said pumping induces superfluorescent emission of light in said active medium.

30. A light source as claimed in claim 15, wherein said optical device comprises an interferometer.

31. An apparatus as claimed in claim 19, wherein said active medium includes a three-level system and wherein said pumping induces superfluorescent emission of light in said active medium.

32. A method of manufacturing a light source as claimed in claim 22, further comprising the step of selecting a three-level system active medium and the step of inducing superfluorescent emission of light in said active medium.

33. A method of manufacturing a light source as claimed in claim 22, wherein said optical device comprises an interferometer.

* * * * *